United States Patent [19]
Castaneda

[11] Patent Number: 4,637,694
[45] Date of Patent: Jan. 20, 1987

[54] AUXILIARY REAR VIEW MIRROR ASSEMBLY AND OUTBOARD MIRROR

[76] Inventor: Albert A. Castaneda, 2752 SW. 24 Terrace, Miami, Fla. 33145

[21] Appl. No.: 769,523

[22] Filed: Aug. 26, 1985

[51] Int. Cl.⁴ .......................... G02B 7/18; G02B 5/08; B60R 1/08
[52] U.S. Cl. .................................... 350/626; 350/636; 350/639; 248/480; 248/487
[58] Field of Search ............... 350/626, 636, 632, 639, 350/623, 612, 606, 604; 248/480, 487

[56] References Cited

U.S. PATENT DOCUMENTS 2,393,056  1/1946  Noblitt et al. ........................ 248/480

FOREIGN PATENT DOCUMENTS 2233254  1/1973  Fed. Rep. of Germany ...... 350/626
2751878  5/1979  Fed. Rep. of Germany ...... 350/626
2256851  8/1975  France ................................ 350/626
2415559  8/1979  France ................................ 350/626
120430  9/1981  Japan .................................. 350/626
131442 10/1981  Japan .................................. 350/623

Primary Examiner—Jon W. Henry
Attorney, Agent, or Firm—John Cyril Malloy

[57] ABSTRACT

An auxiliary mirror assembly of the type primarily designed to be mounted on the external casing of an existing rear view mirror located outboard or extending outwardly from the interior of an automobile or like vehicle. The auxiliary mirror comprises a base, connecting structure, mounting portion and mirror element all cooperatively structured and interconnected to one another such that the mirror element may be substantially universely positioned about a plurality of axes in at least three independent directions.

9 Claims, 4 Drawing Figures

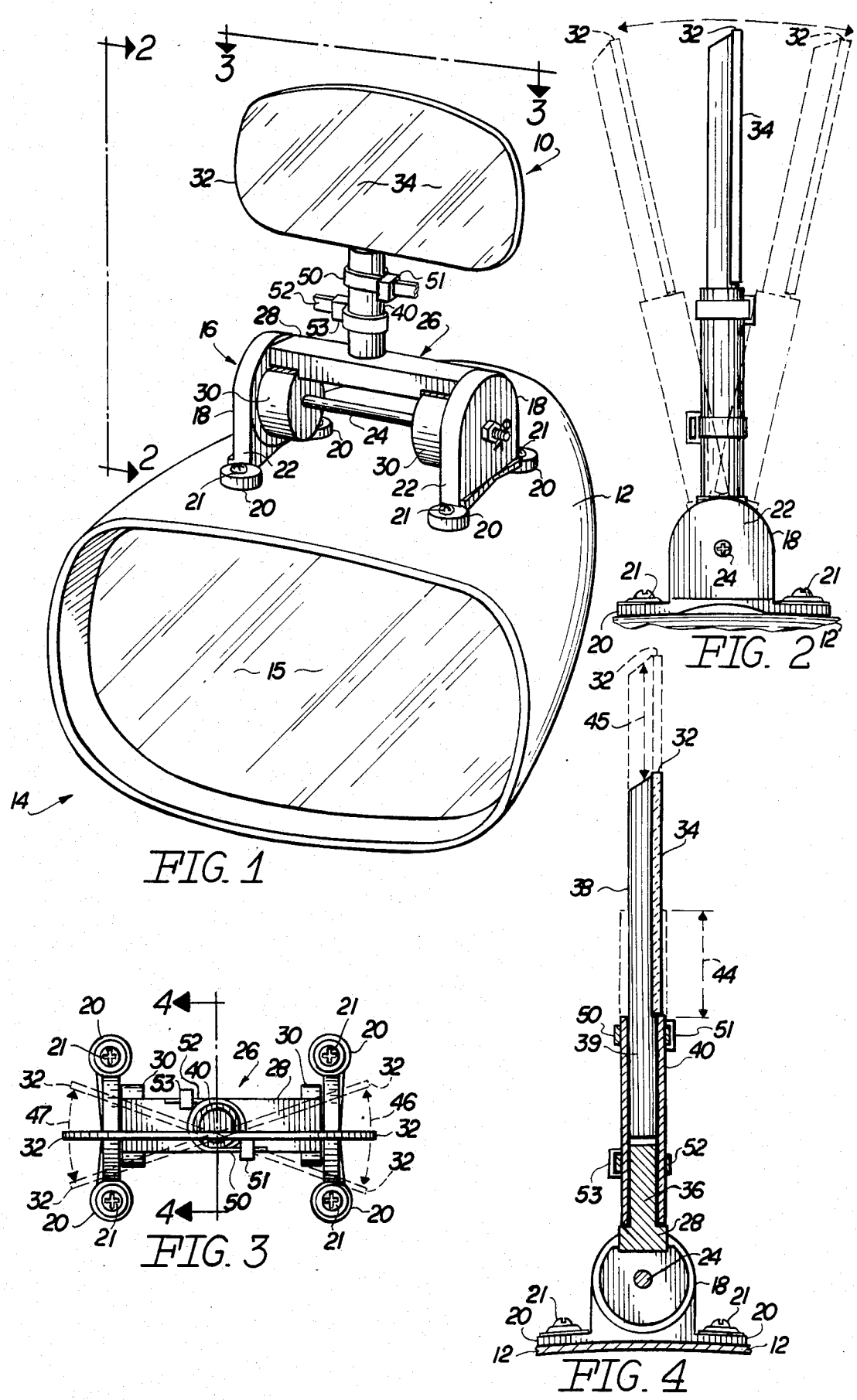

AUXILIARY REAR VIEW MIRROR ASSEMBLY AND OUTBOARD MIRROR

BACKGROUND OF THE INVENTION

1. Field of the Invention

This invention relates to an auxiliary mirror assembly of the type designed to be used in combination with an existing rear view mirror preferably of the type which is located exteriorly on the door of the automobile and commonly known as a "side view mirror" to increase the driver's field of vision rearwardly thus eliminating blind spots, through panning, tilting and up and down adjustments.

2. Description of the Prior Art

Rear view mirror assemblies are common features on virtually all automotive type vehicles. Typically, the rear view mirror consists of a substantially elongated mirror plate mounted on the interior of the vehicle and structured and movably positioned to allow viewing by the driver, through the rear window of the vehicle. The proper positioning of this type of rear view mirror informs the driver of traffic and/or obstacles behind the driver. Other rear view mirror structures commonly utilized in the prior art include externally located mirrors mounted on primarily the driver's side of the vehicle and frequently on both sides of the vehicle. These mirrors are selectively positionable either manually or by remote control from within the interior of the vehicle. The structure and positioning of such side view mirrors allows the driver generally to view a significant portion of the traffic lanes on both sides of the vehicle. This is particularly beneficial when the driver wishes to change lanes and accordingly, needs to be informed of any vehicle or object located rearwardly and in the lane which he intends to enter.

While all of the above set forth structures are commonly used, it is well recognized in the prior art that even if a vehicle is equipped with all three of the above type of mirror structures, "blind spots" still exist. Such blind spots are defined by locations that the driver cannot view merely by looking through any one or all of the rear view mirrors located on the vehicle. The existence of these blind spots have frequently caused major traffic accidents and severe injury to occupants of the vehicles involved. Accordingly, it is common practice for the driver to turn his head in the intended direction when he intends to reposition his vehicle so as to insure the absence of any vehicle or object in the "blind spot" area. This procedure, while commonly practiced is of course very dangerous since the driver is required to take his eyes off the road ahead to accomplish viewing of such blind spot areas. Such practice is particularly dangerous in heavy traffic and frequently results in "rear ending" of the vehicle in front when the driver turns his head to observe the blind spot areas as discussed above.

In order to overcome the above set forth problems, numerous designs exist in the prior art incorporating mirrors of unusual structure such as elongated interiorly located rear view mirrors having one or a plurality of fixed angularly disposed reflective faces which enlarges the field of vision rearwardly of the vehicle. Other mirrors exist in the prior art that are extremely long and even made to occupy the entire frontal section of the vehicle. In addition, combination mirrors are available wherein at least two and often times a larger plurality of mirror faces are provided some of which are movable relative to one another either by remote control or manually to accomplish proper viewing of the blind spot areas.

Mirror structures of the type referred to above are represented in the following U.S. Pat. Nos. to Iannuzzi, 3,048,084; Yuzawa, 3,659,929; and Villa-Real, 4,345,819.

While the above noted prior art devices, including the aforementioned structural modification used to increase the field of vision, are applicable for their intended function, blind spots frequently still exist in that certain ones of the prior art devices lack a certain versatility. This lack of versatility is evidenced by the inability of the mirror structures to be positioned in a "universal" manner or to have a sufficient degree of versatility in the positioning of the auxiliary mirror to eliminate any blind spots or eliminate a particular blind spot known to the driver based on the design of the vehicle and the stature of the driver.

SUMMARY OF THE INVENTION

The present invention is directed towards an auxiliary rear view mirror assembly specifically structured to be mounted on an external casing of what is known in the prior art as a "side view" mirror. The subject auxiliary mirror has as its particular advantage, and novelty, in the ability to position a mirror element or a primary reflective mirror face substantially universally relative to its fixed positioning on the exterior face of an existing side view door mirror attached outboard of a vehicle in the conventional fashion. Such positioning therefore enables the elimination of any particular blind spot of which the driver is aware dependent on the particular design of the vehicle which he is driving. Also, in certain instances the driver may manually (or remotely) reposition the mirror to view any blind spot or viewable area such as persons, or objects such as posts, gullies, etc., located rearwardly of the auxiliary mirror and within its range.

More specifically, the auxiliary mirror comprises a base which is fixedly secured to the top of the external casing of the side view mirror. The base is particularly structured to be mounted on an external portion of a side view mirror regardless of its shape or structure. A support platform is rotatably mounted on the base means so as to be pivotable or rotatable about a central axis of the base means. A connector element extends upwardly from the platform and is structured so as to move therwith.

A mirror element including a primary reflective face is movably connected to the platform by means of a mounting portion disposed in depending relation to the mirror element and structured to movably engage the connector element extending upwardly from the support platform. The connector element and mounting portion are cooperatively structured so as to define a shaft and sleeve attachment wherein the shaft may be defined by the upwardly extending connector element and the sleeve may be defined by the mounting portion disposed in depending relation from the mirror element. The relative dimensions of the sleeve and shaft structures are such as to allow surrounding engagement of the sleeve about the shaft and coaxial positioning of the two elements relative to one another. The relative dimensions of the structures are also such as to allow linear displacement of the sleeve relative to the shaft and rotation of the sleeve relative to the shaft wherein both linear and rotational movements occur to accomplish tilting, panning, and rotation relative to the common, central longitudinal axis of these two elements.

It is readily seen therefore that positioning of the mirror element may be accomplished pivotably relative to the base, rotationally relative to the common longitudinal axis of the shaft and sleeve attachment, and linearly relative to the same common axis. The positioning of the mirror element may therefore be substantially universal in that it may be moved in three, independent directions concurrently or successively.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which FIG. 1 is an isometric view of the auxiliary mirror assembly of the present invention mounted on the external casing of an existing side view mirror which is attached to a vehicle (not shown) in the conventional fashion.

FIG. 2 is a side view of the embodiment of FIG. 1 along line 2—2 wherein rotation of a mirror element of the subject assembly into a plurality of positions is represented in broken lines.

FIG. 3 is a top view along line 3—3 of FIG. 1 further showing rotation of the mirror element about a common central axis of a sleeve and shaft connection to be described in greater detail hereinafter.

FIG. 4 is a sectional view along line 4—4 of FIG. 3 showing interior structural details of the assembly including a locking means disposed and structured to prevent relative movement between the shaft and sleeve attachment.

Like reference numerals refer to like parts throughout the several views of the drawings.

DETAILED DESCRIPTION OF THE PREFERRED EMBODIMENT

As shown in FIG. 1, the auxiliary rear view mirror assembly of the present invention is generally indicated as 10 and, as shown, is specifically structured to be fixedly mounted on the upper or roof portion of an external casing 12 of a side view mirror generally indicated as 14. The side view mirror 14 is of the type typically mounted outboard of the interior of an automotive type vehicle on one or both sides as is common practice. The existing mirror 14 has a reflective mirror face 15 which is selectively positionable to view the area rearward of the vehicle and on the side thereof on which it is mounted. However, in order to eliminate any blind spots and/or provide greater field of vision, rearwardly of the vehicle and to a particular side thereof, the auxiliary mirror assembly 10 comprises a base means generally indicated as 16 including two stationary end portions 18. Each of the end portions includes outwardly extending pedestals 20 serving to engage the upper portion of the exterior casing 12 and being centrally apertured to extend conventional connector elements 21 therethrough into fixed attachment with the external casing 12. The opposite ends of the base means as at 18 are defined by upwardly extending base plates 22 having an elongated axle 24 longitudinally and centrally disposed in interconnecting relation to the base plates 22.

A closed or "bullet" type casing 12 of conventional design is shown in FIG. 1. However, it should be emphasized that base means 16 is adapted for mounting on external portions of side view mirrors of a variety of designs differing from casing 12.

A support platform 26 includes an elongated brace element 28 extending between the base plates 22 but not affixed thereto. Mounting elements 30 are disposed in surrounding movable engagement with the central longitudinally disposed shaft 24 so as to move relative thereto. The brace 28 is fixedly secured at its opposite ends to the mounting elements 30 so as to rotate therewith. Accordingly, and as shown best in FIG. 2, the mirror elements 32 including a primary reflective face 34 is rotatably or pivotably positionable relative to the central axle 24 which serves as the axis of rotation of the mirror element 32. With primary reference to FIGS. 1 and 4, a connector structure in the form of an upwardly extending shaft 36 is fixedly secured to the brace 28 or of a one piece construction therewith. Similarly, the mirror element 32 has an elongated finger 38 affixed to its rear surface and extending dowardly therefrom into a depending finger element 39. A mounting portion in the form of a hollow interior sleeve 40 is fixedly secured to the depending finger 39 and is concentrically positionable in surrounding relation to the upwardly extending shaft 36 defining the connector element. Accordingly, the sleeve 40 and the shaft 36 define a sleeve and shaft attachment wherein these elements are respectively dimensioned so as to be movable relative to one another. More specifically, and again with reference to FIG. 4, the mirror element 32 may be moved linearly along the common central axis of the sleeve 40 and mounting shaft 36 as indicated by directional arrows 44 and 45. Therefore, it is apparent that the mirror element 32 may be raised or lowered as desired by the operator of the vehicle to include, in his field of vision, any desired blind spot.

In addition and with reference to FIG. 3, the respective dimensions of the sleeve 40 and shaft 36 are such a to allow rotation of the sleeve 40 about the shaft 36. Due to the fact that the sleeve 40 is fixedly secured to the depending finger 39, the sleeve moves with the mirror element 32. Directional arrows 46 and 47 therefore indicate that the mirror 32 may be rotated or panned to be positioned so as to increase the rearward field of vision of the operator. It should be readily apparent, from the above that the mirror element 32 is selectively positionable substantially universally relative to the fixed disposition of the base on the upper portion of the external casing 12 of the existing mirror 14. This universal positioning of the mirror element is accomplished by a pivotable or rotational tilting movement of the assembly as shown in FIG. 2 and a linear raising or lowering of the mirror element as shown in FIG. 4, and a rotation or panning of the mirror element 32 about the common central axis of the sleeve and shaft attachment 40 and 36 respectively as shown in FIG. 3.

Another feature of the present invention comprises the locking means which affixes the shaft 39 of the mirror base 34 and the fixedly attached sleeve 40 to the remainder of the upstanding shaft 36. This locking means comprises at least one but preferably a plurality of locking ties 50 and 52 having one end surrounding the exterior of the sleeve 40 but capable of being tightened by a locking structure 51 and 53 attached along the length of the respective straps 50 and 52 respectively. Accordingly, the loosening of the locking structures 51 and 53 relative to the ties 50 and 52 respectively will allow a rotational or panning placement or movement of the mirror 32 in accord with the directional arrows 46 and 47 of FIG. 3. Also, loosening of the ties will allow an infinite raising or lowering of the mirror by movement of the sleeve 40 about the shaft 36 as indicated by directional arrows 44 and 45 of FIG. 4. Again, it is to be emphasized that the shaft 39 is secured on the interior of the sleeve 40 and moves therewith. However, an uppermost tie 50 and locking element 51 may serve to secure finger within sleeve 40 as shown. Therefore, rotational or vertical movement of the mirror 34 occurs by relevant movement between the sleeve 40 and the interior upstanding shaft 36.

It should be readily apparent that the tilting movement as shown in FIG. 2 has nothing to do with the secure positioning of the locking ties 50 and 52 relative to the sleeve 40 but instead occurs through the pivotal movement of platform 26 relative to the upstanding two end portions 18.

Now that the invention has been described:

What is claimed is:

1. In combination, a rear view mirror assembly and an outboard mirror, said assembly being mounted to said outboard mirror and said outboard mirror being adapted to be installed on a vehicle, said outboard mirror including a casing having an upper surface, said assembly comprising:
   (a) base maans for supporting said mirror assembly to the upper surface of said casing of the outboard mirror,
   (b) a support platform movably connected to said base means and rotatable about a substantially central axis thereof and including a connecting structure extending upwardly from said support platform and movable therewith,
   (c) a mirror element including a mounting portion extending upwardly from said support platform, said mounting portion and said connecting structure movably connected to one another and cooperatively structured so as to move both rotatably and linearly relative to one another,
   (d) locking means disposed in interconnected relation between said mounting portion and said connecting structure and structured to prevent relative movement therebetween,
   (e) said central axis of rotation of said base means disposed in perpendicular relation to an axis of rotation of said mounting portion relative to said connecting structure, and
   (f) said support platform, connecting structure and mounting portion cooperatively structured and disposed to allow substantial universal positioning of said mirror element relative to said base means.

2. An assembly as in claim 1 wherein said connecting structure and mounting portion comprise a shaft and sleeve attachment disposed in coaxial relation to one another, a central axis of said shaft and sleeve attachment defining said axis of rotation of said mounting portion relative to said connecting structure.

3. An assembly as in claim 2 wherein said shaft and sleeve attachment is structured for linear movement relative to one another along said axis of rotation.

4. An assembly as in claim 3 wherein said sleeve is attached to said mirror element so as to move therewith, said shaft fixedly secured to said support platform and movable therewith, said sleeve disposed in surrounding, movable relation to said shaft.

5. An assembly as in claim 4 wherein said mirror element comprises a mounting finger disposed in depending relation thereto and fixedly secured to said sleeve so as to move therewith.

6. An assembly as in claim 1 wherein said base means comprises oppositely disposed, spaced apart end portions each fixedly secured to the existing mirror, said axis of rotation of said base means defined by a central, longitudinally disposed axis of said base means.

7. An assembly as in claim 6 wherein said support platform comprises an elongated brace extending between said opposite ends of said base means in substantially, spaced, parallel relation to said central axis of said base means and rotatable thereabout.

8. An assembly as in claim 7 further comprising a shaft extending upwardly from said brace at a point substantially intermediate the ends thereof; a sleeve secured to said mirror element in depending relation thereto, said sleeve movably mounted in surrounding relation to said shaft and defining a shaft and sleeve attachment.

9. An assembly as in claim 8 wherein said shaft and sleeve attachment is collectively defined by said mounting portion and said connecting portion disposed in movable interconnection with one another.

* * * * *